United States Patent [19]
Elwell et al.

[11] Patent Number: 6,146,069
[45] Date of Patent: Nov. 14, 2000

[54] VEHICLE SIDE RAIL HAVING CURLED CROSS SECTION

[75] Inventors: James P. Elwell; Dennis S. Elwell; Dennis L. Elwell, all of Ankeny, Iowa

[73] Assignee: Putco, Inc., Story City, Iowa

[21] Appl. No.: 09/370,296

[22] Filed: Aug. 9, 1999

[51] Int. Cl.[7] .................................................. B60P 7/08
[52] U.S. Cl. ........................ 410/106; 410/101; 410/110; 410/115
[58] Field of Search ..................................... 410/101, 106, 410/108, 110, 115; 296/41, 43; 248/499

[56] References Cited

U.S. PATENT DOCUMENTS

| | | | |
|---|---|---|---|
| 4,248,558 | 2/1981 | Lechner | 410/115 X |
| 4,650,382 | 3/1987 | Johnson | 410/110 |
| 4,954,031 | 9/1990 | Geeck, III | 410/110 |
| 5,228,736 | 7/1993 | Dutton | 410/110 X |
| 5,476,349 | 12/1995 | Okland | 410/106 |
| 5,904,458 | 5/1999 | Bundy | 410/106 |
| 5,967,719 | 10/1999 | Davenport | 410/106 |

*Primary Examiner*—Stephen T. Gordon
*Attorney, Agent, or Firm*—Zarley, McKee, Thomte, Voorhees & Sease

[57] ABSTRACT

A vehicle side rail is formed in cross section into a base portion which attaches to the upper edge of the vehicle side wall and a curled portion which extends upwardly and forms a curved surface above the base portion. Tie-down openings are provided through the curled portion so that tie-down cords may be attached to objects being carried in the carrying compartment.

6 Claims, 3 Drawing Sheets

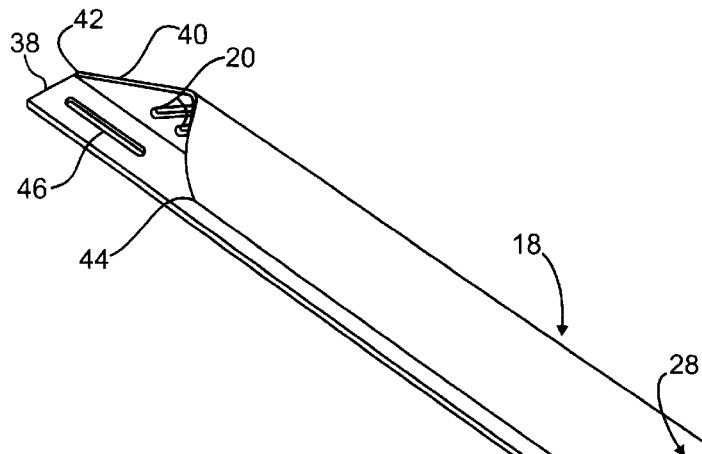
FIG. 2
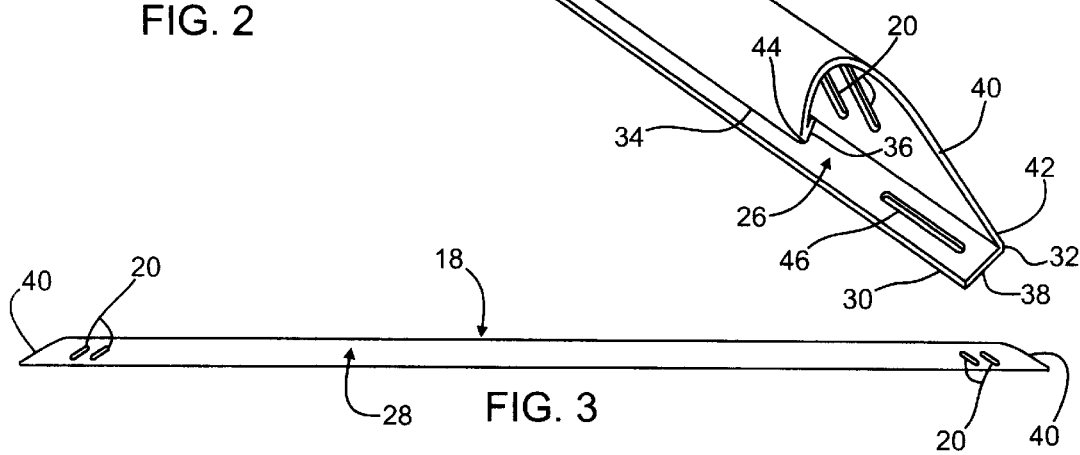
FIG. 3
FIG. 4
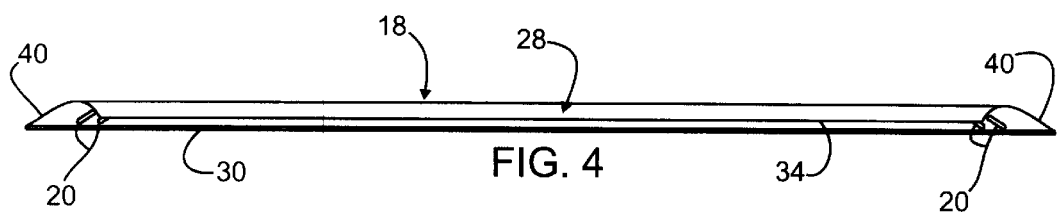
FIG. 5
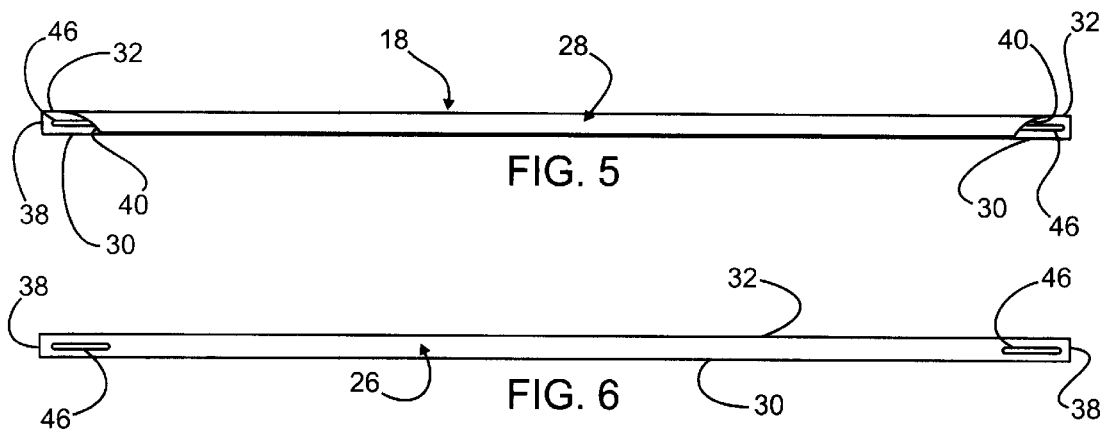
FIG. 6

VEHICLE SIDE RAIL HAVING CURLED CROSS SECTION

BACKGROUND OF THE INVENTION

This invention relates to a vehicle side rail having curled cross section.

Various types of side rails have been provided for pickup trucks. These side rails preferably have certain features. One feature is that the rail should have a Decorative aesthetic appearance which is pleasing to the eye. The rail also should be functional in that it should provide means for tying down objects that are placed within the vehicle carrying compartment. It is also desirable to have a side rail which is easy to grasp and which provides a protection to the upper edges of the side walls of the vehicle carrying compartment.

Therefore, a primary object of the present invention is the provision of an improved vehicle side rail.

A further object of the present invention is the provision of an improved vehicle side rail having a curled cross section which is easy to grasp and which has a pleasing decorative appearance.

A further object of the present invention is the provision of a vehicle side rail which includes means for tying down objects within the vehicle carrying compartment.

A further object of the present invention is the provision of a vehicle side rail which can be easily and sturdily attached to the side walls of the vehicle.

A further object of the present invention is the provision of an improved vehicle side rail which is economical to manufacture, durable in use, and attractive in appearance.

SUMMARY OF THE INVENTION

The foregoing objects may be achieved by a vehicle side rail comprising an elongated member having an elongated base portion and an elongated curled portion. The base portion includes forward and rear edges and first and second opposite ends. The curled portion includes a rear edge extending from the rear edge of the base portion, a longitudinal forward edge spaced above the forward edge of the base portion, and a curled surface extending from the rear edge of the curled portion to the forward edge of the curled portion. The curled portion also includes first and second opposite end edges. The curled surface extends upwardly from the rear edge of the base portion and toward the front edge of the base portion to terminate in the curled portion forward edge.

The vehicle side rail may include tie-down holes extending through the curled surface at the opposite ends thereof for receiving tie-down lines that can be connected to an object contained within the vehicle carrying compartment.

BRIEF DESCRIPTION OF THE FIGURES OF THE DRAWINGS

FIG. 2 is a perspective view of one of the side rails.

FIG. 3 is a rear elevational view of the side rail of FIG. 2.

FIG. 4 is a front elevational view of the side rail of FIG. 2.

FIG. 5 is a top elevational view of the side rail of FIG. 2.

FIG. 6 is a bottom plan view of the side rail of FIG. 2.

DETAILED DESCRIPTION OF THE PREFERRED EMBODIMENT

Figure 1:
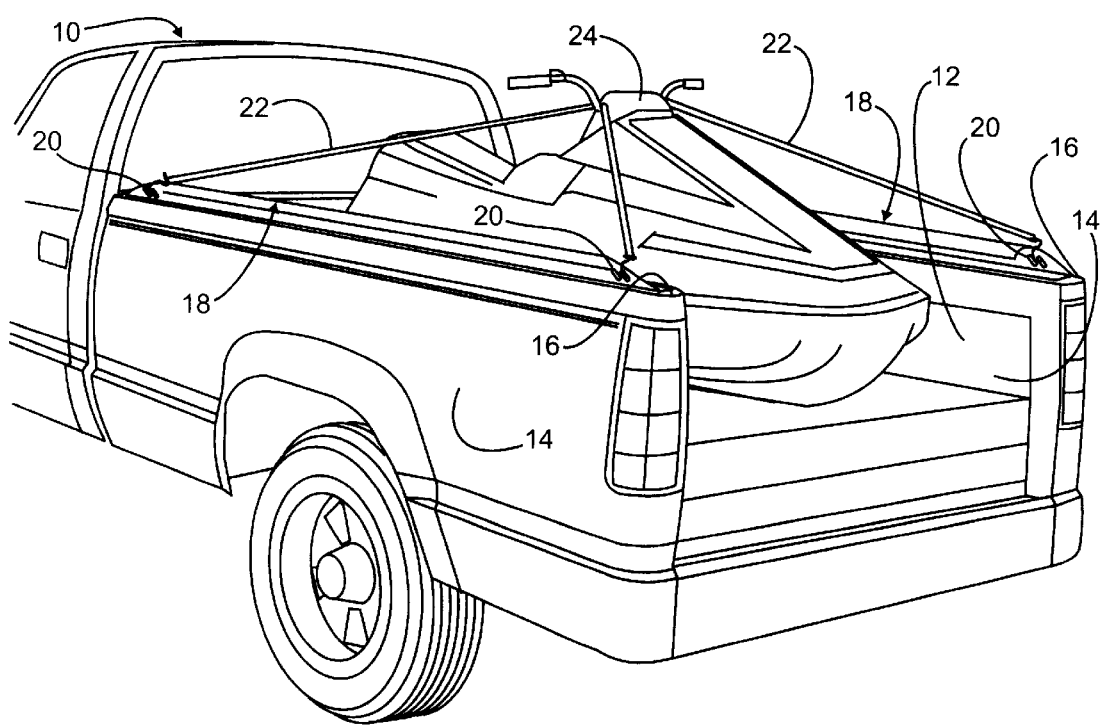
FIG. 1 is a perspective view of a vehicle having the side rails of the present invention mounted thereon.

The description below and the drawings illustrate the preferred embodiment of applicant's invention. However, many features of the invention may be varied without detracting from the invention, and the description of the preferred embodiment is not intended to limit applicant's invention to the specific structure described herein and shown in the drawings.

Referring to the drawings the numeral 10 generally designates a vehicle having a carrying compartment 12 and side walls 14. Side walls 14 each include a top edge 16 on which is mounted a side rail 18.

Side rails 18 each include tie-down openings 20 extending therethrough. The tie-down openings are adapted to receive tie cords 22 which are attached to a load 24 to hold the load against movement within the carrying compartment.

Figure 7:
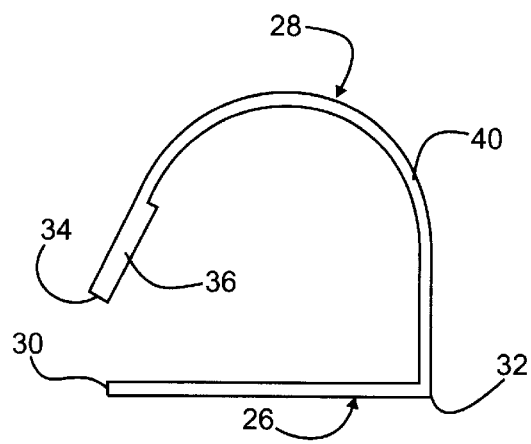
FIG. 7 is an end elevational view of the side rail of FIG. 2.
Figure 8:
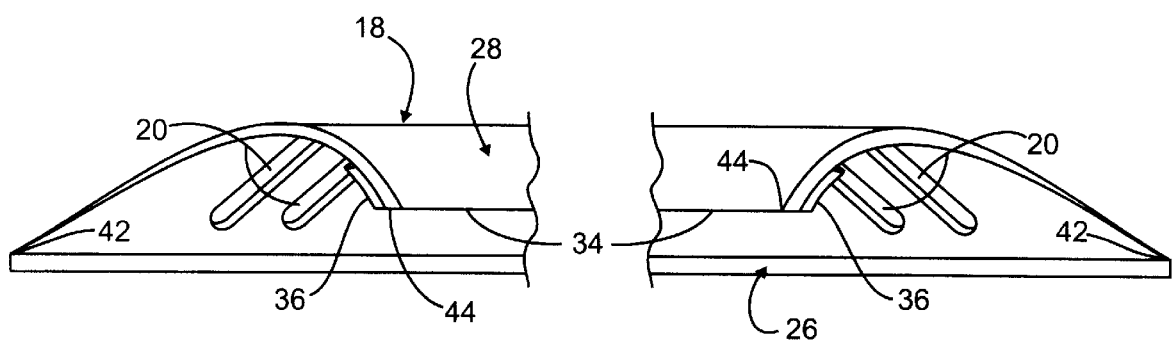
FIG. 8 is an enlarged front elevational view similar to FIG. 3, but showing in more detail the structure of the side rail.

Referring to FIGS. 2–8, the two tie-down rails 18 each include a base portion 26 which is formed into a flat horizontal elongated surface. Extending upwardly from the rear edge or bend line 32 of the base portion 26 is a curled portion 28. The base portion in cross section (FIG. 7) includes a front elongated edge 30 and a rear edge or bend line 32. The curled portion 28 includes a rear edge which commences at the bend line 32 and which extends upwardly and forwardly and then downwardly and forwardly to a front edge 34. The curled portion forms a curled or curved surface between the bend line 32 and the front edge 34. Extending along the front edge 34 is a reinforcing member 36 which strengthens the front edge 34.

The base portion 26 includes opposite end edges 38 and the curled portion 28 includes opposite end edges 40. The end edges 38 of the base 26 are substantially straight and the end edges 40 of the curled portion are essentially curved and follow a substantially helical path. Each of the end edges 40 include an outer end 42 and an inner end 44, and the path of each of the end edges 40 follows a curved helical path between the outer end 42 and the inner end 44. The inner end 44 is spaced axially inwardly from the outer end 42, and is also spaced above the front edge 30 of the base portion 26.

The base portion 26 includes-at its opposite ends a pair of base slots 46 which can receive bolts or other securing members for attaching the rails 18 to the upper edges of the side walls 16 of the vehicle. Different types of securing members for securing the side rails to the side walls 16 of the vehicle are well known in the art and may be varied without detracting from the invention.

The curled portion 28 includes one or more tie-down slots 20 located at the opposite ends thereof. Preferably the tie-down slots 20 at least partially extend between the outer ends 42 and the inner ends 44 of the end edges 40 so that access can be had to the slots or tie-down holes 20.

The rails 18 are attached to the upper edges 16 of the side walls 14, and provide protection for the upper edges 16. They also provide a decorative appearance which is pleasing to the eye. Preferably the rails 18 are chrome plated so as to improve their decorative appearance. Also, the tie-down slots 20 provide means for tying a tie-down cord to the side rails to anchor an object being carried within the carrying compartment. The curled surfaces provide means which are easy to grasp and hold.

In the drawings and specification there has been set forth a preferred embodiment of the invention, and although specific terms are employed, these are used in a generic and descriptive sense only and not for purposes of limitation. changes in the form and the proportion of parts as well as in the substitution of equivalents are contemplated as circumstances may suggest or render expedient without departing from the spirit or scope of the invention as further defined in the following claims.

What is claimed is:

1. A side rail for mounting to the exterior of a vehicle comprising:

an elongated body member having first and second opposite ends, an elongated first edge, and an elongated second edge spaced upwardly above said first edge;

said body member in cross section commencing at said first edge and extending in a horizontal direction to a bend line, then extending upwardly along a curved path from said bend line and back toward said first edge, and terminating in said second edge;

said first and second ends of said body member each comprising a straight edge and a curved edge, said curved edges being approximately helical in shape.

2. A side rail according to claim 1 wherein at least one tie down hole extends through said body member for receiving a tie down line.

3. A vehicle said rail comprising:

an elongated member comprising an elongated base portion and an elongated curled portion;

said base portion having longitudinal forward and rear edges and first and second opposite ends;

said curled portion having a longitudinal rear edge extending from said longitudinal rear edge of said base portion, a longitudinal forward edge spaced above said longitudinal forward edge of said base portion, a curled surface extending from said curled portion rear edge to said curled portion forward edge, and first and second opposite end edges;

said curled surface extending upwardly from said rear edge of said base portion and toward said forward edge of said base portion;

said curled surface extending in a downward direction toward said base portion adjacent said longitudinal forward edge of said base portion;

an elongated reinforcing member attached to and extending along the length of said longitudinal forward edge of said curled portion to provide structural reinforcement thereto.

4. A vehicle side rail according to claim 3 and further comprising at least one opening extending through said curled portion of said elongated member for receiving an elongated flexible tie member.

5. A vehicle said rail comprising:

an elongated member comprising an elongated base portion and an elongated curled portion;

said base portion having longitudinal forward and rear edges and first and second opposite ends;

said curled portion having a longitudinal rear edge extending from said longitudinal rear edge of said base portion, a longitudinal forward edge spaced above said longitudinal forward edge of said base portion, a curled surface extending from said curled portion rear edge to said curled portion forward edge, and first and second opposite end edges;

said curled surface extending upwardly from said rear edge of said base portion and toward said forward edge of said base portion;

said first and second opposite end edges of said curled portion each having an outer end at said first and second opposite ends of said base portion respectively and an inner end located axially inward and upwardly therefrom;

said first and second end edges of said curled portion each extending in a curved partial helical path from said outer end to said inner end.

6. A vehicle side rail according to claim 5 wherein a first tie down hole extends through said curled portion adjacent said first end edge thereof and a second tie down hole extends through said curled portion adjacent said second end edge thereof.

* * * * *